United States Patent
Jagannath et al.

(10) Patent No.: US 12,536,438 B2
(45) Date of Patent: Jan. 27, 2026

(54) IDENTIFYING TRANSPONDER HARDWARE OR WAVEFORM IN WIRELESS NETWORK VIA MACHINE LEARNING MODULE

(71) Applicant: Andro Computational Solutions, LLC, Rome, NY (US)

(72) Inventors: Anu Jagannath, Oriskany, NY (US); Jithin Jagannath, Oriskany, NY (US); Andrew Louis Drozd, Rome, NY (US)

(73) Assignee: Andro Computational Solutions, LLC, Rome, NY (US)

( * ) Notice: Subject to any disclaimer, the term of this patent is extended or adjusted under 35 U.S.C. 154(b) by 669 days.

(21) Appl. No.: 18/047,913

(22) Filed: Oct. 19, 2022

(65) Prior Publication Data

US 2024/0185053 A1 Jun. 6, 2024

(51) Int. Cl.
G06F 7/00 (2006.01)
G06K 7/10 (2006.01)
G06N 3/08 (2023.01)
H04B 1/59 (2006.01)

(52) U.S. Cl.
CPC ........... *G06N 3/08* (2013.01); *G06K 7/10366* (2013.01); *H04B 1/59* (2013.01)

(58) Field of Classification Search
CPC ......... G06N 3/08; G06K 7/10366; H04B 1/59
USPC .................................... 707/600–899; 706/25
See application file for complete search history.

(56) References Cited

U.S. PATENT DOCUMENTS

2022/0272485 A1* 8/2022 Belt ..................... H04W 4/029

OTHER PUBLICATIONS

Jagannath et al., "Embedding-Assisted Attentional Deep Learning for Real-World RF Fingerprinting of Bluetooth," Sep. 22, 2022, retrieved from: https://deepai.org/publication/embedding-assisted-attentional-deep-learning-for-real-world-rf-fingerprinting-of-bluetooth on Jan. 10, 2023, 29 pages.

Jagannath et al., "A Comprehensive Survey on Radio Frequency (RF) Fingerprinting: Traditional Approaches, Deep Learning, and Open Challenges," published Jan. 3, 2022, Comput. Networks, 219, 109455, retrieved from: https://www.semanticscholar.org/paper/A-Comprehensive-Survey-on-Radio-Frequency-(RF)-Deep-Jagannath-Jagannath/cd6f7850c5d4bb0e0a3c56b570dea0e520ec2c45 on Jan. 10, 2023, 31 pages.

* cited by examiner

*Primary Examiner* — Isaac M Woo
(74) *Attorney, Agent, or Firm* — Hoffman Warnick LLC

(57) ABSTRACT

The disclosure provides processes to generate an identification tag for a transponder in a wireless network via a machine learning module. Methods of the disclosure include capturing, via a wireless receiver within a wireless network, a plurality of time-domain communication samples of a transponder operating within the wireless network. A multi-dimensional tensor is generated, indicating a plurality of features of the time-domain communication samples of the transponder. A machine learning module converts the multi-dimensional tensor into a one-dimensional feature vector indicating the plurality of features of the time-domain communication samples. The machine learning module extracts a hardware identification feature for the transponder from the one-dimensional feature vector. The machine learning module includes: an embedding component for extracting the one-dimensional feature vector from a multi-dimensional tensor indicating a set of hardware intrinsic features; or an attentional component for deducing a hardware signature from the one-dimensional feature vector.

20 Claims, 4 Drawing Sheets

IDENTIFYING TRANSPONDER HARDWARE OR WAVEFORM IN WIRELESS NETWORK VIA MACHINE LEARNING MODULE

TECHNICAL FIELD

Embodiments of the disclosure relate to the identifying of transponders in a wireless network. More specifically, embodiments of the disclosure relate to fingerprinting of transponders, i.e., distinguishing between two or more transponders in the same network that may have similar or identical manufacturing or communication specifications.

BACKGROUND

In the context of wireless communication networks, "fingerprinting" is defined as defining hardware intrinsic characteristics of a transmitter that are embedded in the waveforms that a device transmits. Fingerprinting is especially valuable in Bluetooth (also known as "BT") communication networks in which two or more devices have similar or identical manufacturing or operating parameters, and/or send and receive data over similar or identical frequencies. Reliable fingerprinting techniques have proven to be a technical challenge because robust fingerprinting models may require substantial computational demands, whereas less robust fingerprinting models may be inapplicable to many types of devices. The proliferation of wireless devices and the increased use of Internet-of-Things (IoT) devices in a variety of contexts necessitates support for ultra-dense device connectivity within one network. A radio frequency (RF) fingerprint, i.e., the identification(s) produced from RF fingerprinting based on the hardware imperfections of the emitter circuit serves as an excellent tool or watermark to distinguish between devices manufactured by the same manufacturer even while transmitting the same message. In IoT applications where new wireless devices become available at high frequency, the wireless security and the privacy of data shared across the spectrum accessed by these devices is a growing concern. The various approaches towards RF fingerprinting to enhance security of wireless devices that use wireless standards such as WiFi, Bluetooth (BT), and long range (LoRa) radio communication are of particular interest. However, the application of machine learning techniques such as deep learning (DL), especially in a lightweight deployable framework that improves generalization capability for fingerprinting real-world BT devices, is lacking.

SUMMARY

Aspects of the disclosure provide a method including: capturing, via a wireless receiver within a wireless network, a plurality of time-domain communication samples of a transponder operating within the wireless network; generating a multi-dimensional tensor indicating a plurality of features of the time-domain communication samples of the transponder; converting, via a machine learning module, the multi-dimensional tensor into a one-dimensional feature vector indicating the plurality of features of the time-domain communication samples; and extracting a hardware identification feature for the transponder from the one-dimensional feature vector via the machine learning module. The machine learning module includes one of: an embedding component for extracting the one-dimensional feature vector from a multi-dimensional tensor indicating a set of hardware intrinsic features; or an attentional component for deducing a hardware signature from the one-dimensional feature vector.

Further aspects of the disclosure provide a method including: capturing, via a wireless receiver within a wireless network, a plurality of time-domain communication samples of a transponder operating within the wireless network; generating a multi-dimensional tensor indicating a plurality of features of the time-domain communication samples of the transponder; converting, via a machine learning module, the multi-dimensional tensor into a one-dimensional feature vector indicating the plurality of features of the time-domain communication samples; and extracting, via the machine learning module, a waveform identification feature for the transponder from the one-dimensional feature vector. The machine learning module includes one of: an embedding component for translating the multi-dimensional tensor into a waveform specific one-dimensional feature vector; or an attentional component for performing one of modulation recognition or wireless protocol classification.

Additional aspects of the disclosure provide a method including: capturing, via a wireless receiver within a wireless network, a plurality of time-domain communication samples of a transponder operating within the wireless network; generating a multi-dimensional tensor indicating a plurality of features of the time-domain communication samples of the transponder; converting, via a machine learning module, the multi-dimensional tensor into a one-dimensional feature vector indicating the plurality of features of the time-domain communication samples; and extracting a hardware identification feature and a waveform identification feature for the transponder from the one-dimensional feature vector via the machine learning module. The machine learning module includes one of: an embedding component for extracting the one-dimensional feature vector from a multi-dimensional tensor indicating a set of hardware intrinsic features; or an attentional component for deducing a hardware signature from the one-dimensional feature vector or performing one of modulation recognition or wireless protocol classification.

BRIEF DESCRIPTION OF THE DRAWINGS

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Reliable fingerprinting techniques have proven to be a technical challenge because robust fingerprinting models may require substantial computational demands, whereas less robust fingerprinting models may be inapplicable to many types of devices. The proliferation of wireless devices and the increased use of Internet-of-Things (IoT) devices in a variety of contexts necessitates support for ultra-dense device connectivity within one network.

Embodiments of the disclosure address the above-noted concerns, and further concerns, by providing a methodology to identify hardware and waveforms using a trainable machine learning module including, e.g., embedding and attentional components to adjust and contextualize information within time-domain samples of a transponder within a wireless network. Methods of the disclosure operate by capturing, via a wireless receiver within a wireless network, multiple time-domain communication samples of a transponder operating within the wireless network. The wireless receiver and/or a computing device in communication therewith may generate a multi-dimensional tensor indicating a plurality of features of the time-domain communication samples of the transponder. The methodology also includes converting, via a machine learning module, the multi-dimensional tensor into a one-dimensional feature vector. The one-dimensional feature vector indicates a plurality of features of the time-domain communication samples. The method may also include extracting a hardware identification feature or waveform identification feature for the transponder from the one-dimensional feature vector via the machine learning module.

The machine learning module(s) implemented in embodiments of the disclosure may include an embedding component for extracting the one-dimensional feature vector from a multi-dimensional tensor indicating a set of hardware intrinsic features or translating the multi-dimensional tensor into a waveform specific one-dimensional feature vector. Additionally, or alternatively, the machine learning module may include an attentional component for deducing a hardware signature from the one-dimensional feature vector or performing modulation recognition and/or wireless protocol classification.

In the description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The description is, therefore, merely exemplary.

Figure 1:
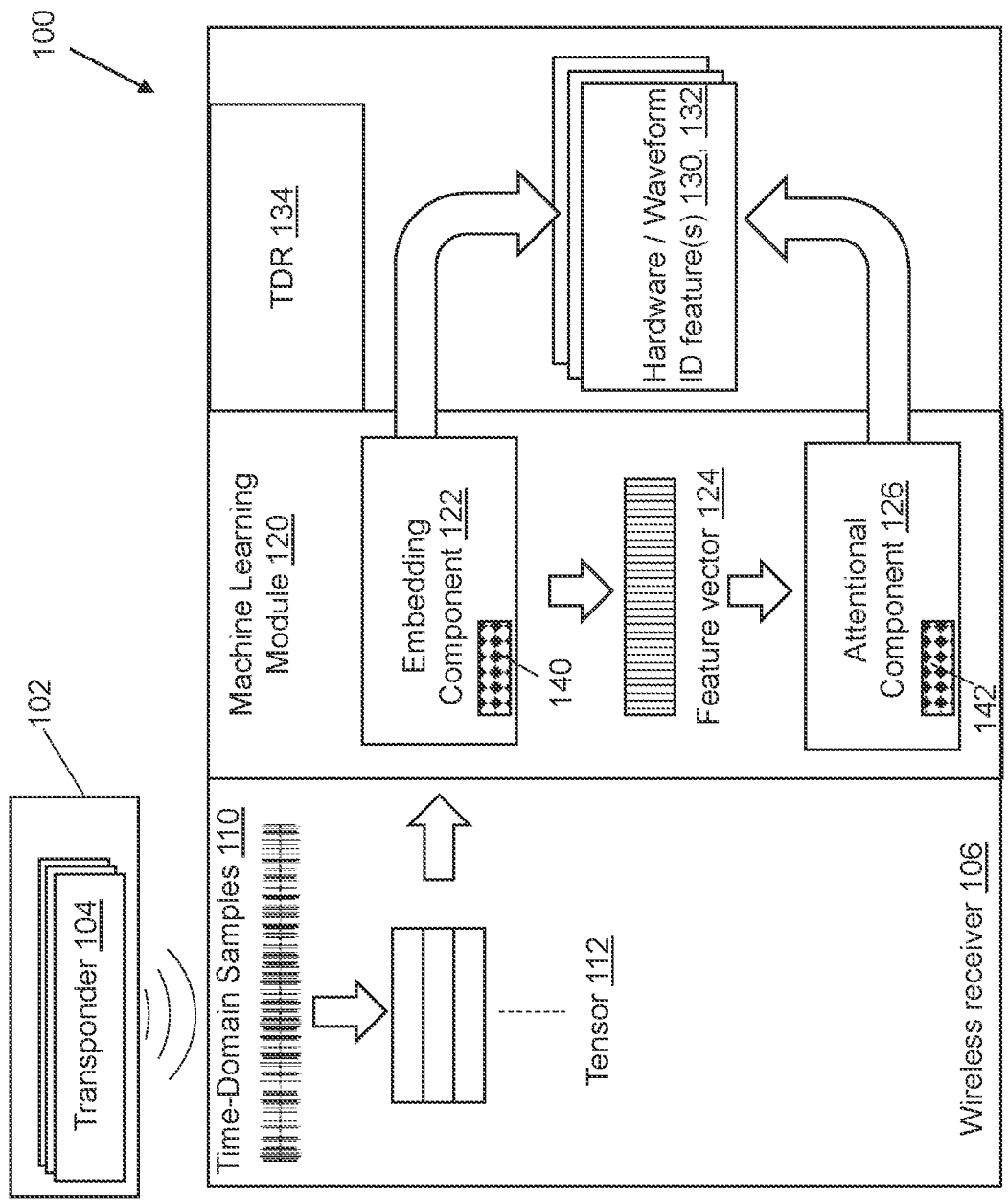
FIG. 1 provides a schematic diagram of a system including a wireless receiver with a machine learning module for implementing methods according to the disclosure.

Turning to FIG. 1, a schematic view of a system 100 for implementing methods of the disclosure in a wireless network 102 is shown. Wireless network 102 may be any conceivable type of wireless communication networks, including without limitation, one or more RF networks such as BT, LoRa, WiFi, etc. Wireless network 102 may include one or more transponders 104 (i.e., independent and/or interconnected devices such as autonomous agents, computing devices, routers and/or other network hardware, etc.) communicatively coupled to a wireless receiver 106. Wireless receiver 106 may be an additional transponder 104 or portion thereof configured to sense and/or capture communication signals from other transponders 104 in wireless network 102, a separate computing device within or otherwise in communication with wireless network 102, a base station and/or other dedicated receiver hardware in wireless network 102, etc. Transponders 104 may be in communication with each other over network 102. Each transponder 104 may represent one or more devices capable of communicatively exchanging data with other transponders 104 via network 102, e.g., phones, tablets, personal computers, and/or any other conceivable device configured for network communication. Transponder(s) 104 of network 102 each may include a memory or similar storage system for storing and retrieving information, e.g., data and metadata. Metadata refers to a category of data for recording information about other data, e.g., dates of recordation, filenames, statistical data, etc.

Embodiments of the disclosure include a machine learning assisted (e.g., via embedding and/or attentional components) methodology for RF fingerprinting of transponders 104 in wireless network 102. Two or more transponders 104 in network 102 in some cases may have a same manufacturer or may be configured to transmit identical signals within network 102. In this case, embodiments of system 100 are operable to distinguish between specific transponders 104 notwithstanding any identicality in manufacturing and/or operating specifications. Embodiments of the disclosure implement wireless receiver 106 to collect emission from transponder(s) 104 in the form of time-domain capture samples (simply "samples" hereafter) 110 for processing to yield hardware or waveform identification features. Samples 110 may be captured in the form of, e.g., BT emissions from transponder(s) 104 in the form of IoT devices via multipath propagation and non-line-of-sight settings to detect and record waveforms within wireless network 102. Non-line-of-sight refers to settings where transponder(s) 104 and wireless receiver 106 not in perfect view of each other and may be blocked by obstacles within the environment of network 102. In some cases, samples 110 may include signals emitted from transponder 104 at multiple operating frequencies (e.g., Bluetooth waveforms transmitted with 1600 frequency changes ("hops") per second, which may be randomly spread among seventy or more channels at set intervals (e.g., 1 Megahertz (MHz)) over a frequency span (e.g., approximately 2.402 Gigahertz (GHz) to 2.480 GHz).

Wireless receiver 106 may include hardware and/or software components for using samples 110 to generate a multi-dimensional tensor 112. Multi-dimensional tensor 112 (simply "tensor" hereafter) mathematically defines a multilinear relationship in vector space between sets of algebraic quantities, e.g., time, frequency, and channel. Tensor 112 provides a representation of samples 110 that enable mathematical frameworks for characterizing spatially dependent characteristics, e.g., detected RF signals in various locations within wireless network 102. Although tensor 112 may have any desired number of dimensions suitable for quantifying and characterizing samples 110, it is understood that tensor (s) 112 for each sample may be in three-dimensional space in certain implementations. Various techniques for generating tensor 112 are generally understood in the art and thus not discussed in further detail herein.

Although tensor 112 compiles substantial amounts of technically relevant information for transponder 104 in a unified representation, tensor 112 may require substantial amounts of processing power, memory, etc., for RF fingerprinting operations. For instance, tensor 112 may include waveform information such as magnitude, phase, power spectral density, etc. Embodiments of the disclosure may implement a machine learning module 120 with subcomponents, e.g., an embedding component 122, for reducing the dimensionality of tensor(s) 112 to produce a one-dimensional feature vector (simply "feature vector" hereafter) 124. Feature vector(s) 124 may be specific to hardware features of transponder(s) 104 within network 102, specific to waveforms transmitted from transponder(s) 104 within network 102, and/or may have a combination of hardware and waveform features for analysis. Embedding component 122 may be any currently known or later developed machine learning hardware or software, based on training data available within a training data repository (TDR) 134 for converting quantities in multi-dimensional space into a dense, lower-dimensional expression of the higher dimensional data. Embedding component 122 thus may include one or more known or later developed embedding models for providing such functions, e.g., principal component analysis (PCA), singular value decomposition (SVD), etc.

In some implementations, embedding component 122 may be operable to extract a hardware identification feature 130 and/or a waveform identification feature 132 directly from tensor(s) 112 without first reducing their dimensionality. Hardware identification feature 130 may be a hardware signature of a respective transponder 104 that embedding component 122 deduces from feature vector 124, i.e., hardware identification feature 130 may not be included within feature vector 124 but rather is predicted based on the contents of feature vector 124. In other cases, hardware identification feature 130 may include a set of hardware intrinsic features of a respective transponder 104 included within feature vector 124 itself. Waveform identification feature 132, by contrast, may be a recognized modulation of waveform(s) emitted by transponder(s) 104 within network 102 and included within feature vector 124. Alternatively, or additionally, waveform identification feature 132 may include a wireless protocol classification deduced from the contents of feature vector 124 despite not being included within feature vector 124.

Machine learning module 120 further may include an attentional component 126 for further processing of feature vector(s) 124, e.g., by increasing the significance of some data within feature vector(s) 124 while diminishing the significance of other data within feature vector(s) 124. In a simplified example, attentional component 126 may include multiplying certain quantities by weighting factors based on known preferences controlled by a user and/or learned preferences stored within TDR 134. Such preferences may be in the form of a learned representation from attentional component 126 and/or may be learned by subcomponents of machine learning module 120 and/or neural networks in a subcomponent thereof. Attentional component 126 may be trained according to any currently known or later developed methodology suitable for prioritizing and/or deprioritizing data within feature vector(s) 124, e.g., gradient descent or further techniques and/or hardware discussed herein. Attentional component 126 may be configured to decipher and identify hardware signature(s) of transponder(s) 104 as hardware identification feature(s) 130, e.g., based on information within samples 110 and TDR 134, as well as predicted deployment scenarios not included within TDR 134, In various implementations, the functionality of machine learning module 120 is expandable by including, e.g., a convolutional neural network (CNN) 140 within embedding component 122 for extracting feature vector(s) 124 from tensor(s) 112, and/or a gated recurrent unit (GRU) 142 architecture within attentional component 126 for implementing one-dimensional convolutions on feature vector(s) 124. CNN 140 may operate together with GRU 142 in a hybrid manner to perform attentional learning to focus and weight various portions of feature vector 124. For example, CNN 140 may be operable to capture a timing relationship of sample(s) 110 while GRU 142 extracts before-after timing dependencies (e.g., a timing relationship illustrating change in one or more quantities within tensor 112 over time) of samples 110 via feature vector 124.

Figure 2:
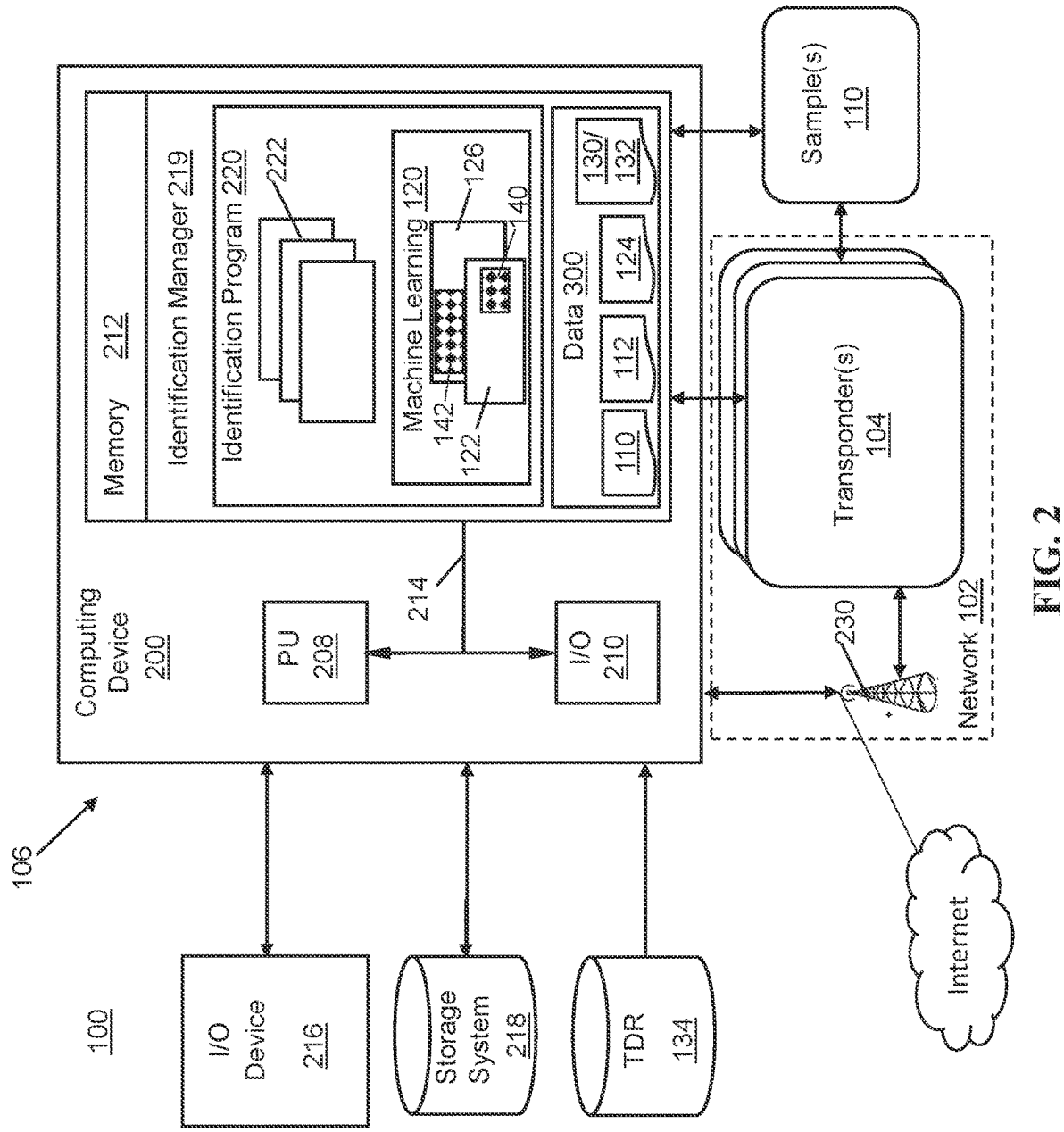
FIG. 2 shows a schematic view of an illustrative environment for identifying hardware and waveforms in a wireless network according to embodiments of the disclosure.

Turning to FIG. 2, embodiments of the wireless receiver 106 within system 100 may be implemented using a computing device 200. Computing device 200 may be integrated into wireless receiver(s) 106 and/or other components described herein (e.g., one or more transponders 104), or may be an independent component connected to one or more devices within network 102. According to another example, computing device 200 may be connected to or otherwise part of transponder(s) 104. Computing device 200 is shown connected to network 102 and multiple transponders 104 in the example embodiment shown in FIG. 2. Computing device 200 may include a processor unit (PU) 208, an input/output (I/O) interface 210, a memory 212, and a bus 214. Further, computing device 200 is shown in communication with an external I/O device 216, a storage system 218 and TDR 134. External I/O device 216 may be embodied as any component for allowing user interaction with computing device 200. Memory 212 may implement an identification manager 219, included wholly or partially within memory 212 of computing device 200, which in turn may represent at least a portion of one transponder 104. Identification manager 219 may be configured to progress any conceivable tensor 112 lengths or dimensionalities. Identification manager 219 can execute an identification program 220, which in turn can include various modules 222, e.g., one or more software components configured to perform different actions, including without limitation: a calculator, a determinator, a comparator, etc. Modules 222 can implement any currently known or later developed analysis technique for using machine learning module 120 to process sample(s) 110 to extract waveform and/or hardware identification features 130, 132. As shown, computing device 200 may be in communication with other transponders 104 for sending and/or receiving various forms of data to implement the functions of identification manager 219. Thus, computing device 200 in some cases may operate as a part of each transponder 104, while in other cases the same computing device 200 may be connected to or included within an intermediate component (e.g., a base station 230) between two or more transponders 104.

Modules 222 of identification manager 219 can use calculations, look up tables, and similar tools stored in memory 212 for processing, analyzing, and operating on data to perform their respective functions. In general, PU 208 can execute computer program code, such as identification program 220 which can be stored in memory 212 and/or storage system 218. While executing computer program code, PU 208 can read and/or write data to or from memory 212, storage system 218, and/or I/O interface 210. Bus 214 can provide a communications link between each of the components in computing device 200. I/O device 216 can comprise any device that enables a user to interact with computing device 200 or any device that enables computing device 200 to communicate with the equipment described herein and/or other computing devices. I/O device 216 (including but not limited to keyboards, displays, pointing devices, etc.) can be coupled to transponder(s) 104/computing device 200 either directly or through intervening I/O controllers (not shown).

Memory 212 can include a cache of data 300 organized for reference by identification manager 219. As discussed elsewhere herein, computing device 200 can send, receive, and/or rely various types of data 300, including metadata pertaining to other devices of network 102. Data 300 thus may be classified into multiple fields and, where desired, sub-fields within each field of data 300. Data 300 may be provided to and/or from transponder 104, e.g., via network 102 and/or I/O device 216. To exchange data between multiple transponders 104, computer system 200 may be communicatively connected to other communication features of transponder 104 (I/O component 210 and/or I/O device 216). In some cases, these communication features may also be contained within memory 212 of computer system 200.

Data 300 can optionally be organized into a group of fields. In some cases, data 300 may include various fields for cataloguing sample(s) 110, tensor(s) 112, and feature vector(s) 124 as they are processed within identification program 220. Data 300 further may include hardware and/or waveform identification features 130, 132 produced from implementing methods of the disclosure discussed herein. One or more fields of data 300 further may be catalogued within TDR 134 and/or storage system 218. Each type of data 300, however embodied, may be accessible to identification program 220, which in turn may operate as a sub-program within identification manager 219. Data 300 may be mixed and parsed using identification program 220 as it interfaces with a local static database, e.g., via the internet, to store regulatory and stakeholder access decisions. Identification program 220 thus may output spectrum access rules directly to transponder(s) 104 and may permit validation feedback triggers for identification features(s) 130, 132 via internet communication.

Computing device 200, and/or transponder(s) 104 which include computing device 200 thereon, may comprise any general purpose computing article of manufacture for executing computer program code installed by a user (e.g., a personal computer, server, handheld device, etc.). However, it is understood that computing device 200 is only representative of various possible equivalent computing devices that may perform the various process steps of the disclosure. To this extent, in other embodiments, computing device 200 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 200 may include a program product stored on a computer readable storage device, which can be operative to extract hardware and/or waveform identification features 130, 132.

Figure 3:
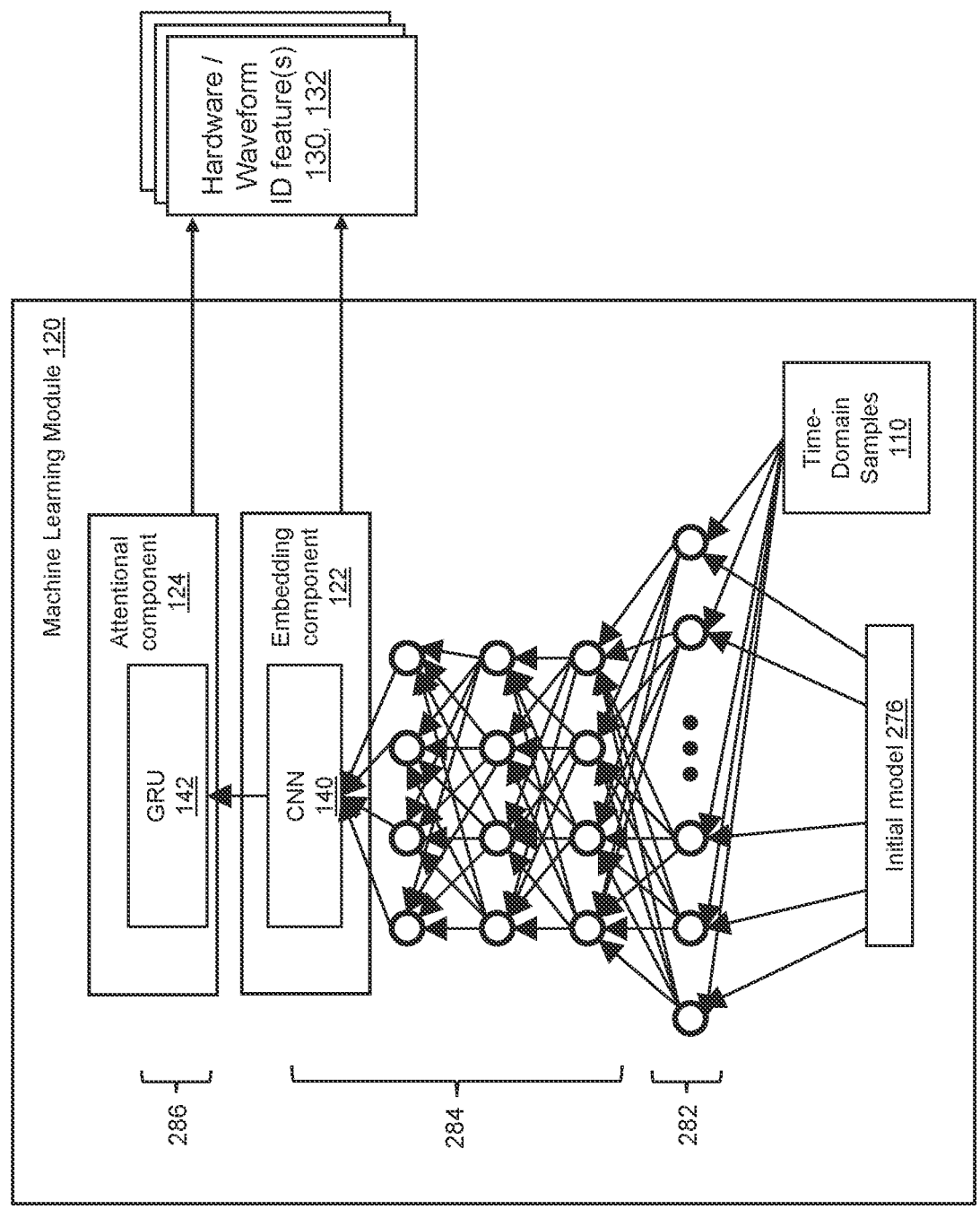
FIG. 3 shows a schematic diagram of an illustrative machine learning module for implementing methods according to embodiments of the disclosure.

Turning to FIG. 3, various functions identification program 220 may be implemented via machine learning module 120, e.g., any mathematical or algorithmic object capable of estimating an unknown function. A neural network (e.g., CNN 140) is one example of a component that may be implemented as, or within, machine learning module 120. Machine learning module 120 is shown via a schematic diagram to further illustrate processes for identifying hardware and waveforms for transponder(s) 104 (FIGS. 1, 2) according to the disclosure. Machine learning module 120 can relate one or more input variables (e.g., an initial model 276 contained within, e.g., a library of training data such as TDR 134) to hardware and/or waveform identification features 130, 132 (FIGS. 1, 2) for transponders 104 (FIGS. 1, 2) within network 102 (FIGS. 1, 2). Initial model(s) 276 may represent initial functions for relating various elements of sample(s) 110 to hardware and/or waveform identification features 130, 132 for transponder(s) 104, and/or modified value functions produced from past instances of operating network(s) 102 with transponder(s) 104 therein.

A layer of inputs 282 includes, e.g., input(s) provided via network 102, transponder(s) 104, and/or other information transmitted to identification program 220 via I/O interface 210 and/or device 216. Inputs 282 can together define multiple nodes. Each node and respective input 282 may be connected to other nodes in a hidden layer 284, which represents a group of mathematical functions. In embodiments of the present disclosure, inputs 282 can include, e.g., initial model(s) 276 for relating various inputs to hardware and/or waveform identification features 130, 132. Each node of hidden layer 284 can include a corresponding weight representing a factor or other mathematical adjustment for converting input variables into output variables. The nodes of hidden layer 284 can eventually connect to embedding component 122, which in turn connects to attentional component 126 in an output layer 286 of machine learning module 120 Machine learning module 120 may receive sample(s) 110 for immediate processing as part of the layer of input(s) 282. However, it is understood that other input(s) from transponder(s) 104 also may additionally or alternatively be included in hidden layer 284 in other implementations. In embodiments of the disclosure, output 286 from machine learning module 120 can include hardware and/or waveform identification features 130, 132 that wireless receiver 106 may use to interact with network 102 and/or perform various other actions.

Machine learning module 120 may include, or take the form of, any conceivable machine learning system, and examples of such systems are described herein. In one scenario, machine learning module 120 may include or take the form of an artificial neural network (ANN), and more specifically can include one or more sub-classifications of ANN architectures (e.g., CNN 140 as discussed herein, or other types of neural networks such as a fully connected neural network, recurrent neural network, and/or combinations of these examples and/or other types of artificial neural networks), whether currently known or later developed. In further implementations, machine learning module 120 and/or embedding component 122 thereof optionally may include CNN 140 for predicting action(s) from initial model 276. CNNs may be distinguished from other neural network models, e.g., by including individual nodes in each layer which respond to inputs in a restricted region of a simulated space known as "a receptive field." The receptive fields of different nodes and/or layers can partially overlap such that they together form a depiction of a visual field (e.g., network 102 and samples 110 collected therefrom, represented in multi-dimensional space). The response of an individual node to inputs within its receptive field can be approximated mathematically by a convolution operation. CNN 140, in this case, may perform attentional learning to focus and weight portions of any feature vectors 124 (FIG. 1) produced from hidden layers 284. CNN 140, more specifically, may implement one-dimensional convolutions on feature vector 124 to capture a timing relationship of samples 110.

With continued reference to FIGS. 1 and 2, the operation of machine learning module 120 is discussed in further detail. Machine learning module 120 may assist identification manager 219 in extracting hardware and/or waveform identification features 130, 132. Machine learning module 120 may, for example, assist identification manager 219 by facilitating cooperation between embedding component 122 and attentional component 126, or by independent action of either component 122, 124, in network(s) 102 or other environments not reflected in initial model 276. Machine learning module 120 may provide a deep learning framework using CNN 140 to extract identification features 130, 132 and/or reduce the dimensionality of tensor(s) 112 to create feature vector(s) 124. CNN 140 within embedding component 122 maps the high-dimensional expression within tensor(s) 112 to feature vector(s) 124, which embedding component 122 may feed into CNN 140 and GRU 142 of attentional component 126 to provide an attentional classifier. During operation, attentional component 126 may extract the spatial and sequential patterns of feature vector(s) 124, hence allowing isolation of a fingerprint from other less-relevant factors. This technique thus combines inherent advantages of CNN 140 and GRU 142 to extract hardware and/or waveform identification features 130, 132.

In an example implementation, inputs from transponder(s) 104 can be processed in wireless receiver 106 as signals subdivided into a set number ("N") of sample(s) 110. The function expression may be denoted as y(t)|N,=1. RF fingerprinting may require larger input sample lengths and additional features to be within tensor 112 than would be acceptable in non-fingerprinting applications. The length of each sample 110 may be large (e.g., several minutes or more) to allow machine learning module 120 determine an input format that yields an acceptable fingerprinting accuracy. The length of each sample 110 may be large (e.g., indicating a time of several minutes or more) to allow machine learning module 120 to determine an appropriate input format. To provide tensor 112 as a three-dimensional expression, machine learning module 120 may implement the following operation:

$$Y^{3 \times M} = \tilde{\mathcal{X}}[\hat{y}(t)_{t=1}^{M}]$$

$$= \begin{bmatrix} |\hat{y}(t)_{t=1}^{M}| \\ \angle \hat{y}(t)_{t=1}^{M} \\ PSD(\hat{y}(t)_{t=1}^{M}) \end{bmatrix}$$

where <ŷ(t)M/t=1 is the downsampled version of ŷ(t)N/t=1, the first two rows contain the magnitude and phase of the decimated form of signal ŷ (t), and the third row is a power spectral density (PSD) (i.e., the power levels of the frequency components present in a signal) of the decimated signal.

Embodiments of the disclosure may rely upon the feature extraction capability of CNN 140 to process the input tensor Y. Embedding component 122 may implement a dimensionality reduction step to map the multi-dimensional tensor 112 to feature vector 124. To implement this capability, embedding component 122 may treat tensor 112 as a multi-channel input and adopt one-dimensional convolutional kernels to encode the dependencies between the adjacent sample(s) 110 in each input channel. Embedding component 122 itself may be subdivided into layers, e.g., three convolutional layers with one-dimensional kernels which feed into dense layers. The number of convolutional layers may vary depending on the number of dimensions in tensor 112. The dense layers may generate feature vector 124 for further processing by attentional component 126.

Attentional component 126 in machine learning module 120 extracts the inter-dependencies in sample(s) 110 and focuses on relevant portions of sample(s) 110 via feature vector 124 using fewer layers than other components of machine learning module 120. Attentional component 126 may provide a hybrid model using CNN 140 and GRU 142. As CNN 140 performs one-dimensional convolutions on feature vector 124 to capture the timing relationship between sample(s) 110, GRU 142 extracts the before-after timing dependencies of sample(s) 110. GRU 142 may be particularly effective to provide a long short term memory (LSTM) since it uses only two gates: "Update" and "Reset," instead of three gates as in other types of LSTM. Further, GRU 142 may be particularly beneficial within network 102 as it does not possess an internal memory or an output gate. GRU 142 thus may have fewer training parameters and memory and hence trains faster than other types of LSTM. The Update gate within GRU 142 may control the amount of past information that needs to be carried over to the next state. The Reset gate within GRU 142 may determine the amount of previous history that needs to be forgotten. GRU 142 may be implemented via the following set of equations, $$u_t = \sigma(W_u x_t + R_u h_{t-1} + b_u)$$

$$r_t = \sigma(W_r x_t + R_r h_{t-1} + b_r)$$

$$\hat{h}_t = \tanh(W_h x_t + R_h(r_t \odot h_{t-1}) + b_h)$$

$$h_t = (1 - u_t) \odot h_{t-1} + u_t \odot \hat{h}_t$$

where $x_t$ is the input vector, $W_i$ and $R_i$ are the weight matrices (subscript "i" indicating a general notation), $b_i$ the bias vector (subscript u denoting update, subscript r denoting reset, subscript h denoting hidden state), $h_t$ indicates candidate hidden state, tanh(°) is the hyperbolic tangential activation function, and σ(°) is the sigmoid activation function.

Feature vector(s) 124 transmitted to attentional component 126 may feed into two convolutional branches, and where applicable, an additional branch transmitted to GRU 142. The notations C1, C2, and G denote the operations of the first convolutional branch, second convolutional branch, and the GRU branch respectively. The output from the convolutional branches are vectorized (flattened) forms of their respective feature maps. The GRU branch is a many-to-1 type of GRU whose output is also a vector. The operations of attentional component 126 may be governed by the following set of equations, $$o_1 = \mathcal{C}_1(f) \quad s = \text{SiLU}(o_3)$$

$$o_2 = \mathcal{C}_2(f) \quad a = [o_1; o_2; s]$$

$$o_3 = \mathcal{G}(f)$$

Where "s" is the scoring vector function approximation obtained by applying Sigmoid Linear Unit (SiLU) activation to the output from GRU branch. The SiLU activation multiplies the input (x) by its sigmoid activation (σ(x)). The operator ";" indicates vector concatenation. The final attentional vector a is generated by concatenating the outputs from the convolutional branches with the scoring vector s. This scoring vector is fed into the subsequent dense layers for final softmax emitter classification to provide hardware and/or waveform identification features 130, 132. "Softmax" refers to a mathematical function for converting a vector of numbers into a vector of probabilities proportional to the relative scale of each value in the vector.

In embodiments of the disclosure, embedding component 122 may be initially trained to classify transponder(s) 104 initially by including a softmax dense layer in its architecture. The softmax dense layer may be ignored after training and after feature vector 124 is transmitted to attentional component 126. Attentional component 126 is may then be trained independently while keeping the weights for layers within embedding component 122 unchanged. Identification manager 219 may monitor the convergence of network 102 during training and freeze the parameters within machine learning module 120 at a desired or calculated point of convergence.

Machine learning module 120 may train and evaluate models using a variety of performance metrics. Such metrics may include, e.g., true positives (TP), true negatives (TN), false positives (FP), and false negatives (FN). A true positive rate (TPR) or "recall" quantifies the positive predictions made by the machine learning module 120 with respect to total positive predictions. A false positive rate (FPR) measures the false predictions of machine learning module 120 in proportion to the total false predictions. A top-1 accuracy (or balanced accuracy) is the arithmetic mean of the recall for each class. A total number of floating point operations ("FLOPs") may be used as a performance metric for the model(s). Similarly, the total number of trainable parameters in the model also may indicate quality of the model(s). The maximum measured input tensor lengths supported by the model without causing any out-of-memory (OOM) errors also may be used to evaluate model strength.

Figure 4:
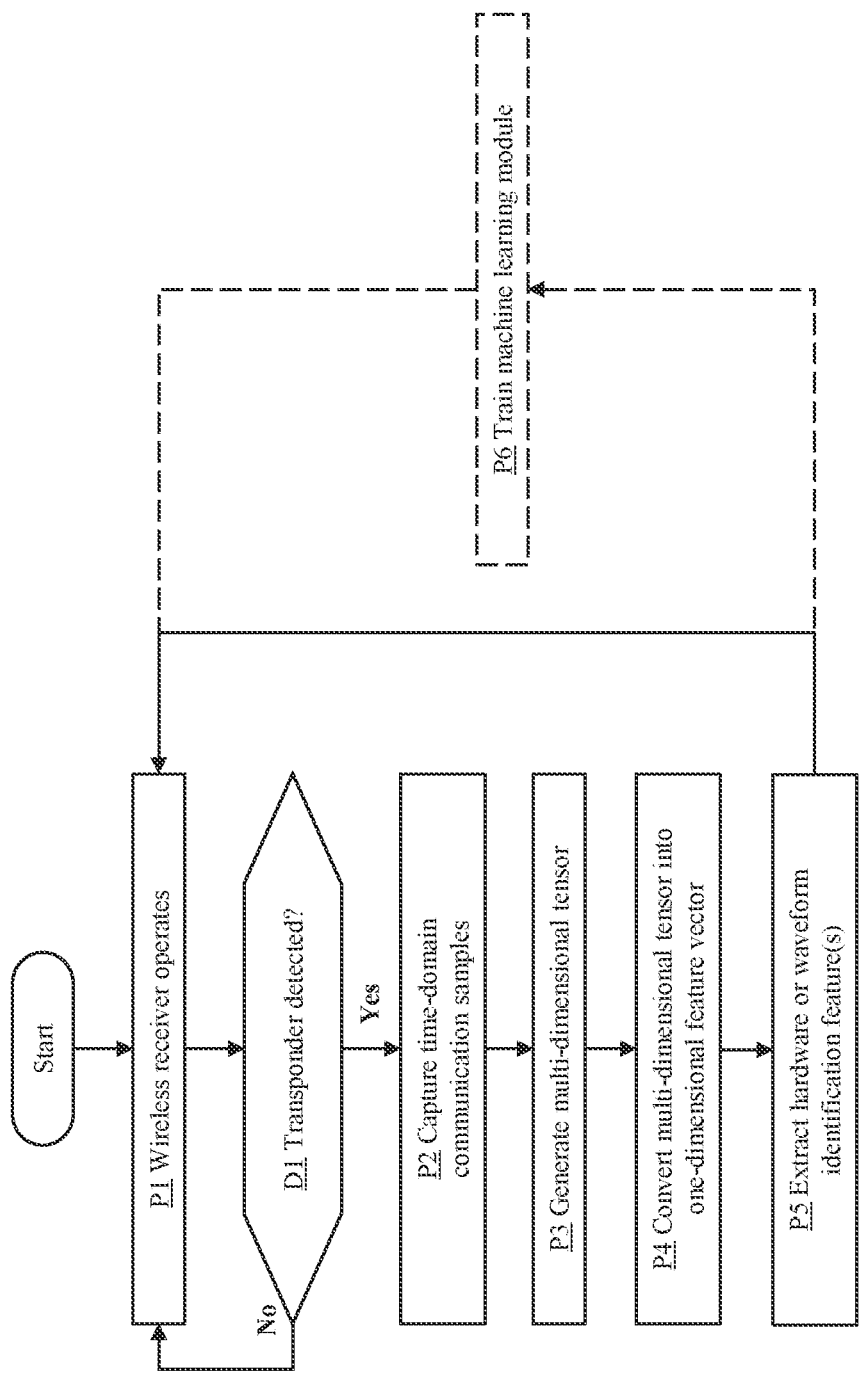
FIG. 4 shows an illustrative flow diagram of an operational methodology for implementing methods according to the disclosure.

Referring to FIGS. 1-4 together, in which FIG. 4 provides an illustrative flow diagram, methods according to the disclosure are discussed. Methods according to the disclosure may be implemented through embodiments of system 100 and/or computing device 200, and more specifically through components and/or subcomponents thereof as discussed herein. Upon initiation of the method (i.e., "Start" in FIG. 4), wireless receiver 106 in process P1 may begin operating within network 102 to monitor communication within network 102, e.g., via an antenna or other signal monitoring hardware. At decision D1, wireless receiver 106 may detect one or more transponder(s) 104 operating within network 102. When no transponders are detected (i.e., "No" at decision D1), wireless receiver 106 will continue to operate and/or monitor further communication within network 102. When one or more transponders 104 are detected within network 102 (i.e., "Yes" at decision D1) the method may continue to process P2 of capturing sample(s) 110 from any transponder(s) 104 operating within network 102. Process P2 may include capturing any desired number of sample(s) 110 over a selected time interval, e.g., hundreds or thousands of samples 110 for each transponder 104, or more.

Process P3 in embodiments of the disclosure may include generating multi-dimensional tensor 112 from sample(s) 110, e.g., using modules 222 of identification program 220 to map various sampled quantities into a multi-dimensional vector space (e.g., three-dimensional space). Rather than using tensor 112 directly to identify waveforms and/or hardware within network 102, embodiments of the disclosure modify tensor 112 to produce feature vector 124, i.e., a lower-dimensionality or single-dimensional quantity indicating various features from sample(s) 110, as discussed elsewhere herein. Machine learning module 120 in process P4 may convert tensor 112 into feature vector 124, e.g., using embedding component 122 and/or CNN 140 thereof. Feature vector 124 then may be submitted to attentional component 126 and/or GRU 142 thereof. Methods of the disclosure may include operating CNN 140 and GRU 142 in a hybrid manner, e.g., by extracting feature vector 124 via CNN 140 and using GRU 142 to implement one-dimensional convolutions on feature vector 124 to capture a timing relationship between sample(s) 110, i.e., conditions where one type of signal reflected in sample(s) 110 causes transponder 104 to issue another kind of signal within sample(s) 110. GRU 142 in particular may extract before-after timing dependencies of such signals within or between sample(s) 110.

Process P5 in embodiments of the disclosure may include extracting hardware and/or waveform identification features 130, 132 from feature vector 124, e.g., based on various performance metrics included within feature vector 124. Upon extracting hardware and/or waveform identification features 130, 132 in process P5, the method may return to process P1 of continuing to monitor network 102 for transponder(s) 104. In still further embodiments, the method may include process P6 of training machine learning module 120 by comparing hardware and/or waveform identification features 130, 132 with known properties for each transponder 104 to evaluate and/or update machine learning module 120 for future instances of capturing sample(s) 110 from transponder(s) 104. In still further implementations, e.g., to improve the robustness of operation in diverse deployment scenarios and/or other circumstances not yet included within TDR 134, machine learning module 120 may be configured to extract identification feature(s) 130, 132 solely via embedding component 122, in which case attentional component 126 is solely for converting tensor(s) 112 into feature vector 124.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., soldering, fastening, ultrasonic welding, bonding). In various embodiments, electronic components described as being "coupled" can be linked via conventional hard-wired and/or wireless means such that these electronic components can communicate data with one another.

The terminology used herein is for the purpose of describing particular example embodiments only and is not intended to be limiting. As used herein, the singular forms "a," "an," and "the," may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method comprising:
capturing, via a software-defined radio (SDR) wireless receiver within a wireless network, a plurality of contiguous raw in-phase and quadrature (IQ) base-band time-domain communication samples of a transponder operating within the wireless network;
generating a multi-dimensional tensor indicating a plurality of features of the raw IQ base-band time-domain communication samples of the transponder;
converting, via a machine learning module, the multi-dimensional tensor into a one-dimensional feature vector indicating the plurality of features of the raw IQ base-band time-domain communication samples; and
extracting a hardware identification feature for the transponder from the one-dimensional feature vector via the machine learning module;
wherein the machine learning module includes one of: an embedding component for extracting the one-dimensional feature vector from a multi-dimensional tensor indicating a set of hardware intrinsic features; or an attentional component for deducing a hardware signature from the one-dimensional feature vector.

2. The method of claim 1, wherein the machine learning module further includes:
a convolutional neural network (CNN) within the embedding component for extracting the one-dimensional feature vector from the multi-dimensional tensor; and
the attentional component, wherein the attentional component includes a hybrid CNN and gated recurrent unit (GRU) architecture configured to implement one-dimensional convolutions on the one-dimensional feature vector to capture a timing relationship of the time-domain communication samples while the GRU extracts before-after timing dependencies of time-domain communication samples.

3. The method of claim 1, wherein the capturing includes sensing a plurality of operating frequencies for the transponder prior to demodulation recognition.

4. The method of claim 1, wherein the attentional component is configured to decipher and identify hardware signatures of the transponders in deployment scenarios not included in a training data repository for the machine learning module.

5. The method of claim 1, wherein the multi-dimensional tensor includes separate magnitude, phase and power-spectral-density channels.

6. The method of claim 1, wherein the machine learning module is configured to extract the hardware identification feature solely via the embedding component, wherein the attentional component is solely for converting the multi-dimensional tensor into the one-dimensional feature vector.

7. The method of claim 1, wherein the transponder is one of a plurality of devices within the wireless network, each of the plurality of devices having a same manufacturer or configured to transmit identical signals within the wireless network.

8. A method comprising:
capturing, via a software-defined radio (SDR) wireless receiver within a wireless network, a plurality of contiguous raw in-phase and quadrature (IQ) base-band time-domain communication samples of a transponder operating within the wireless network;

generating a multi-dimensional tensor indicating a plurality of features of the raw IQ base-band time-domain communication samples of the transponder;

converting, via a machine learning module, the multi-dimensional tensor into a one-dimensional feature vector indicating the plurality of features of the raw IQ base-band time-domain communication samples; and extracting, via the machine learning module, a waveform identification feature for the transponder from the one-dimensional feature vector;

wherein the machine learning module includes one of an embedding component for translating the multi-dimensional tensor into a waveform specific one-dimensional feature vector, or an attentional component for performing one of modulation recognition or wireless protocol classification.

9. The method of claim 8, wherein the embedding component extracts a waveform specific feature vector from the multi-dimensional tensor and relays the waveform specific feature vector to the attentional component.

10. The method of claim 8, wherein the attentional component includes a hybrid convolutional neural network-gated recurrent unit (CNN-GRU) architecture configured to perform attentional learning to focus and weight portions of the one-dimensional feature vector.

11. The method of claim 8, wherein the machine learning module includes only the embedding component, and wherein the embedding component is further configured to perform modulation recognition or wireless protocol classification.

12. The method of claim 8, wherein the capturing includes sensing a plurality of operating frequencies for the transponder prior to demodulation recognition.

13. The method of claim 8, wherein the multi-dimensional tensor includes separate magnitude, phase and power-spectral-density channels.

14. The method of claim 8, wherein the transponder is one of a plurality of devices within the wireless network, each of the plurality of devices having a same manufacturer or configured to transmit identical signals within the wireless network.

15. A method comprising:
capturing, via a software-defined radio (SDR) wireless receiver within a wireless network, a plurality of contiguous raw in-phase and quadrature (IQ) base-band time-domain communication samples of a transponder operating within the wireless network;

generating a multi-dimensional tensor indicating a plurality of features of the raw IQ base-band time-domain communication samples of the transponder;

converting, via a machine learning module, the multi-dimensional tensor into a one-dimensional feature vector indicating the plurality of features of the raw IQ base-band time-domain communication samples; and extracting a hardware identification feature and a waveform identification feature for the transponder from the one-dimensional feature vector via the machine learning module; wherein the machine learning module includes one of: an embedding component for extracting the one-dimensional feature vector from a multi-dimensional tensor indicating a set of hardware intrinsic features; or an attentional component for deducing a hardware signature from the one-dimensional feature vector or performing one of modulation recognition or wireless protocol classification.

16. The method of claim 15, wherein the machine learning module includes only the embedding component, and wherein the embedding component is further configured to perform modulation recognition or wireless protocol classification.

17. The method of claim 15, wherein the capturing includes sensing a plurality of operating frequencies for the transponder before demodulation recognition.

18. The method of claim 15, wherein the multi-dimensional tensor includes separate magnitude, phase and power-spectral-density channels.

19. The method of claim 15, wherein the transponder is one of a plurality of devices within the wireless network, each of the plurality of devices having a same manufacturer or configured to transmit identical signals within the wireless network.

20. The method of claim 15, wherein the machine learning module further includes:
a convolutional neural network (CNN) within the embedding component for extracting the one-dimensional feature vector from the multi-dimensional tensor; and
the attentional component, wherein the attentional component includes a hybrid CNN and gated recurrent unit (GRU) architecture configured to implement one-dimensional convolutions on the one-dimensional feature vector to capture a timing relationship of the time-domain communication samples while the GRU extracts before-after timing dependencies of time-domain communication samples.

* * * * *